United States Patent [19]

Judice

[11] 3,937,878

[45] Feb. 10, 1976

[54] ANIMATED DITHERED DISPLAY SYSTEMS

[75] Inventor: Charles Norris Judice, Lincroft, N.J.

[73] Assignee: Bell Telephone Laboratories, Incorporated, Murray Hill, N.J.

[22] Filed: Jan. 21, 1975

[21] Appl. No.: 542,863

[52] U.S. Cl...... 178/7.3 D; 315/169 TV; 340/324 M
[51] Int. Cl.² ............................................ H04N 3/14
[58] Field of Search ................... 178/7.3 D, DIG. 3; 340/324 M; 315/FTD, 366, 169 TV

[56] References Cited
UNITED STATES PATENTS

| | | | |
|---|---|---|---|
| 3,571,505 | 3/1971 | Mounts | 178/6.8 |
| 3,787,834 | 1/1974 | Elliott | 315/169 TV |
| 3,843,959 | 10/1974 | Owaki et al. | 178/7.3 D |
| 3,887,763 | 6/1975 | Hinoshita et al. | 178/DIG. 3 |

OTHER PUBLICATIONS

Haskell et al., Proceedings of the IEEE, July 1972, Vol. 60, pp. 792–800.

*Primary Examiner*—George H. Libman
*Attorney, Agent, or Firm*—Ronald D. Slusky

[57] ABSTRACT

Dithered display systems are adapted to present animated images via a conditional replenishment technique. The only cells of the display panel which are accessed for any given frame are cells which are to have states in that frame which differ from their respective states in the previous frame. Additionally, random scintillations in animated dithered displays are substantially eliminated by establishing a hysteresis band about the dither threshold value assigned to each display cell. The hysteresis band is delimited by upper and lower dither threshold values. Determination of whether the intensity of a given picture element of the image to be displayed is to be compared to the upper or the lower dither threshold value assigned to the corresponding display cell is made based on the current state of the cell.

15 Claims, 5 Drawing Figures

ANIMATED DITHERED DISPLAY SYSTEMS

BACKGROUND OF THE INVENTION

The present invention relates to bi-level display systems and, in particular, to adaptation of such systems for presentation of animated gray-scale images.

At the heart of a bi-level display system is a display panel typically comprising a matrix of individual, closely spaced display cells each of which resides in one of two visual states. That is, each display cell is either completely energized (on) or completely de-energized (off). Picture images and other graphic data are readily displayed on a bi-level display panel via selective energization of its cells.

Since the cells of a bi-level display panel are either completely on or completely off, the panel has no inherent capability for representing gray scale in reproduced images. Advantageously, however, it is known that a subjective impression of gray scale can be produced by way of a technique known as "dither processing." In a so-called "dithered display system" the observer is made to perceive various shades of gray, i.e., various intensities in the reproduced image by appropriate arrangement of on and off cells.

Dither is implemented in a bi-level display system by dividing the image to be reproduced into a matrix of picture elements, each element corresponding to a respective cell of the display panel. A predetermined dither threshold value is assigned to each display cell. If the intensity of any given picture element is greater than the dither threshold value assigned to the corresponding display cell, that cell is turned on. Otherwise, it is maintained off.

SUMMARY OF THE INVENTION

The principal object of the present invention is to provide a dithered display system capable of presenting animated images. In theory, this object could be simply achieved by displaying successive dithered frames of an animated sequence at a rate sufficient for the eye to integrate them into smooth, continuous motion. A "write", or "energize", signal would be extended to each cell which is to be on for a given frame, and an "erase", or "deenergize" signal would be extended to each cell which is to be off for that frame. However, this animation technique requires that the display cells be accessed to receive a write or an erase signal at a very rapid rate since each cell must be accessed in each frame whether or not its state in a particular frame is different from its state in the previous frame. Unfortunately, the cells in some bi-level display panels, including for example most commercially available plasma display panels, cannot be accessed fast enough to display a sufficiently large number of frames per second to present a pleasing animated image. Bi-level display panels which do have this capability are very expensive.

Accordingly, a specific object of the invention is to provide a relatively inexpensive animated dithered display system.

A more particular object of the invention is to adapt dithered display systems having slow-access-rate display panels for presentation of animated images.

A more specific object of the invention is to adapt dithered plasma display systems for presentation of animated images.

These and other objects are achieved in a dithered display system in accordance with the invention by implementing therein a technique referred to as "conditional replenishment." In accordance with this technique, the only display cells which are accessed for any given frame are cells which are to have states in that frame which differ from their respective states in the previous frame. The remaining cells are not accessed at all but, rather, are maintained in their respective previous on or off states. In presenting many types of animated dithered images, such as faces, only a small fraction of the display cells have different states in successive frames. Thus, by implementing the above-described conditional replenishment technique in a plasma or other display system having slow-access-rate cells, successive frames of dithered animated images can be presented at a frame rate sufficient to provide smooth, continuous motion.

BRIEF DESCRIPTION OF THE DRAWING

The invention may be clearly understood from a consideration of the following detailed description and accompanying drawing in which.

DETAILED DESCRIPTION

Figure 1:
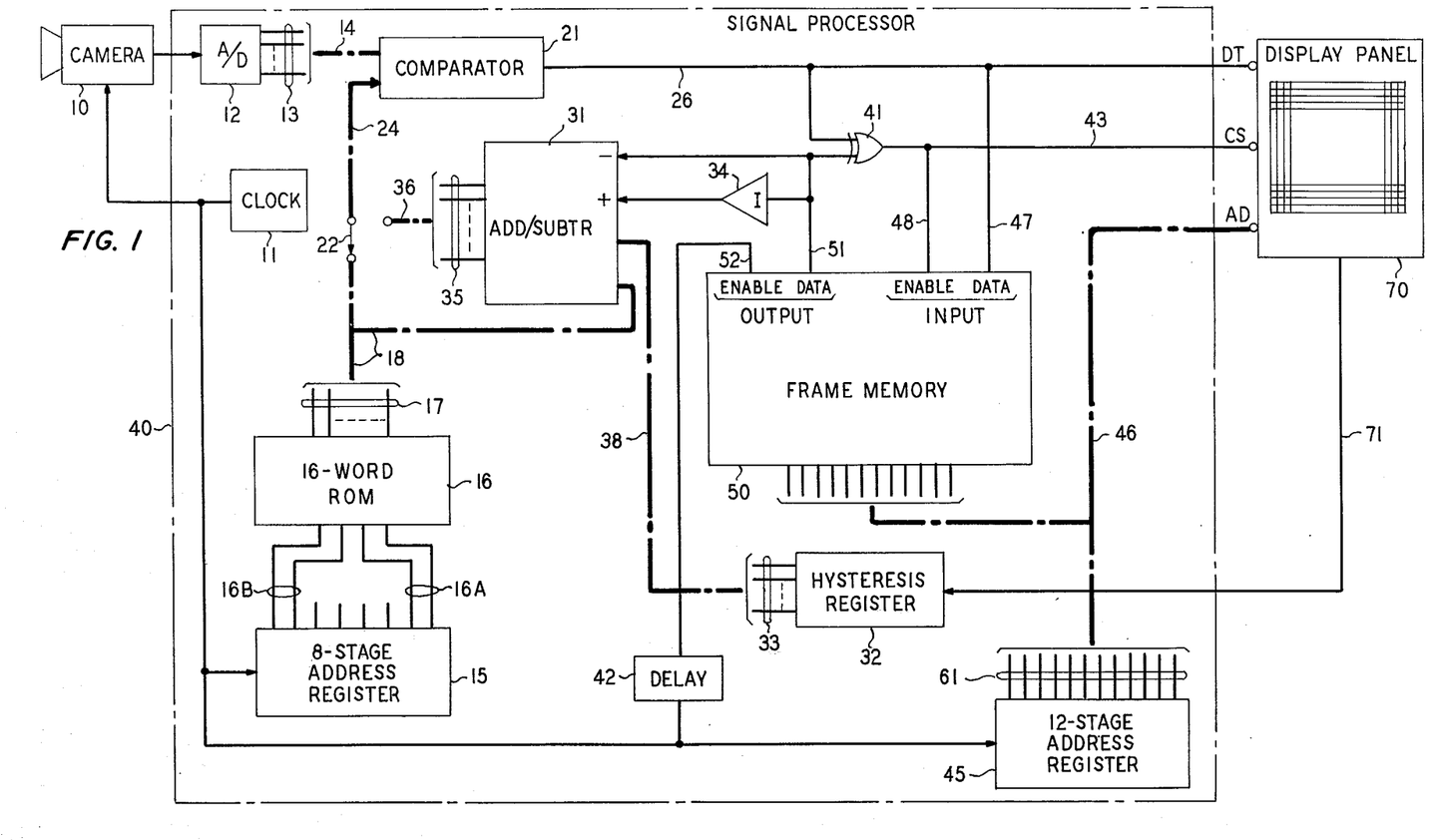
FIG. 1 is a block diagram of an illustrative dithered display system adapted in accordance with the invention to present animated images.

The animated dithered display system of FIG. 1 includes a camera 10, a signal processor 40 and a bi-level display panel 70. Panel 70 is illustratively a plasma display panel such as that disclosed in D. T. Ngo U.S. Pat. No. 3,671,938 issued June 20, 1972. Advantageously, however, the present invention can be implemented in a system including virtually any type of bi-level display panel. Panel 70 comprises 4096 display cells arranged in a square matrix to 64 rows and 64 columns. Of course, it will be appreciated that the number of cells is, again, merely illustrative. Each of the cells of bi-level display panel 70 resides in one of two visual states-either fully energized, or on, or fully de-energized, or off.

Figure 2:
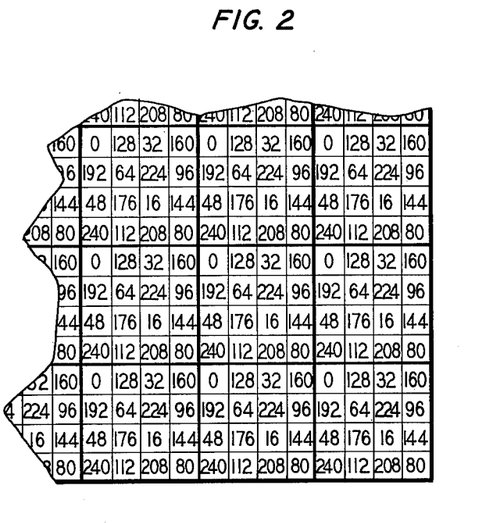
FIG. 2 is an enlarged view of a portion of the display panel utilized in the display system of FIG. 1 and shows the dither threshold values assigned to the cells of the panel.

A small portion of the lower right-hand corner of panel 70 is shown in enlarged view in FIG. 2. As indicated in that figure, each of the cells of panel 70 is assigned a dither threshold value taken from the predetermined sixteen-element "dither matrix"

$$\begin{bmatrix} 0 & 128 & 32 & 160 \\ 192 & 64 & 224 & 96 \\ 48 & 176 & 16 & 144 \\ 240 & 112 & 208 & 80 \end{bmatrix}.$$

As also indicated in FIG. 2, the cells of panel 70 may be conceptualized as being divided into a plurality of sub-matrices each comprising sixteen cells. There is thus assigned a different threshold value from the dither matrix to each cell of any given submatrix.

The dither matrix utilized in a dithered display system such as that shown in FIG. 1 can be chosen to comprise more or fewer than sixteen elements, depending on the needs of the particular application. Advantageously, increasing the number of cells per dither matrix increases the number of shades of gray which are represented in the reproduced image without degrading the spatial resolution of the image. Conversely, decreasing the number of cells per dither matrix provides more limited gray scale capability.

For best results, numerically successive threshold values of a dither matrix, whatever its size, should be spatially separated from one another within the matrix. It is known that a generalized n cell-by-n cell dither matrix $D_n$ which fulfills this criterion, n being an integer power of 2, can be constructed by combining the four matrices $k[4D_{n/2}]$, $k[4D_{n/2} + U_{n/2}]$, $k[4D_{n/2} + 2U_{n/2}]$ and $k[4D_{n/2} + 3U_{n/2}]$ in two-by-two arrangement such as $$D_n = \begin{bmatrix} k[ & 4D_{n/2} & ] & k[4D_{n/2} + 2U_{n/2}] \\ k[ & 4D_{n/2} + 3U_{n/2} & ] & k[4D_{n/2} + U_{n/2}] \end{bmatrix}.$$

This is a recursive definition in which $D_2$ is a two-by-two matrix comprising the numbers 0, 1, 2 and 3 such as the matrix $$\begin{bmatrix} 0 & 2 \\ 3 & 1 \end{bmatrix}.$$

$U_2$ is a two-by-two matrix each element of which is 1, and $k$ is a predetermined scalar constant. The 16-element dither matrix $D_4$ utilized in the display system of FIG. 1 is derived from the above definition with $k$ chosen to be 16. If desired, a 64-element dither matrix $D_8$ can be derived from dither matrix $D_4$ using this definition, and so forth. It is preferable, although not necessary, that the matrices $k[4D_{n/2}]$ and $k[4D_{n/2} + U_{n/2}]$ be on the same one diagonal of dither matrix $D_n$ and the numbers 0 and 1 be on the same one diagonal of matrix $D_2$.

An image to be presented on panel 70 in accordance with known dither processing techniques is scanned in a format which divides the image into a matrix of 4096 picture elements arranged in 64 rows and 64 columns. Each scanned picture element thus corresponds to a single one of the cells of panel 70. The intensity of each picture element in the illustrative embodiment is quantized into one of 256 intensity levels, or values. The quantized intensity value of each picture element is compared to the dither threshold value assigned to the corresponding display cell. If the intensity value of any given picture element is greater than the dither threshold value assigned to the corresponding display cell, that cell is turned on. Conversely, if the intensity value of any given picture element is less than or equal to the dither threshold value assigned to the corresponding display cell, that cell is maintained off.

Figure 3:
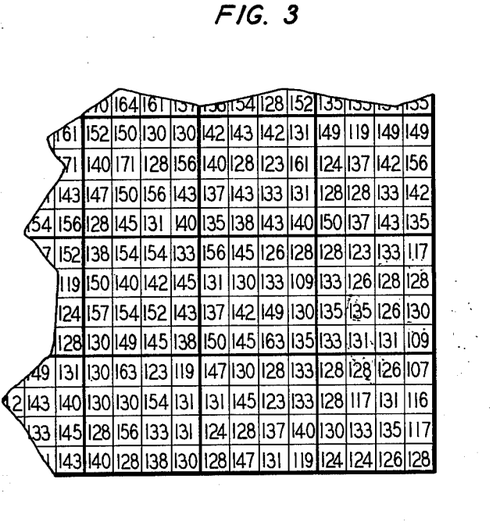
FIG. 3 is a map of picture element intensity values for a small portion of an illustrative image to be presented by the display system of FIG. 1.
Figure 4:
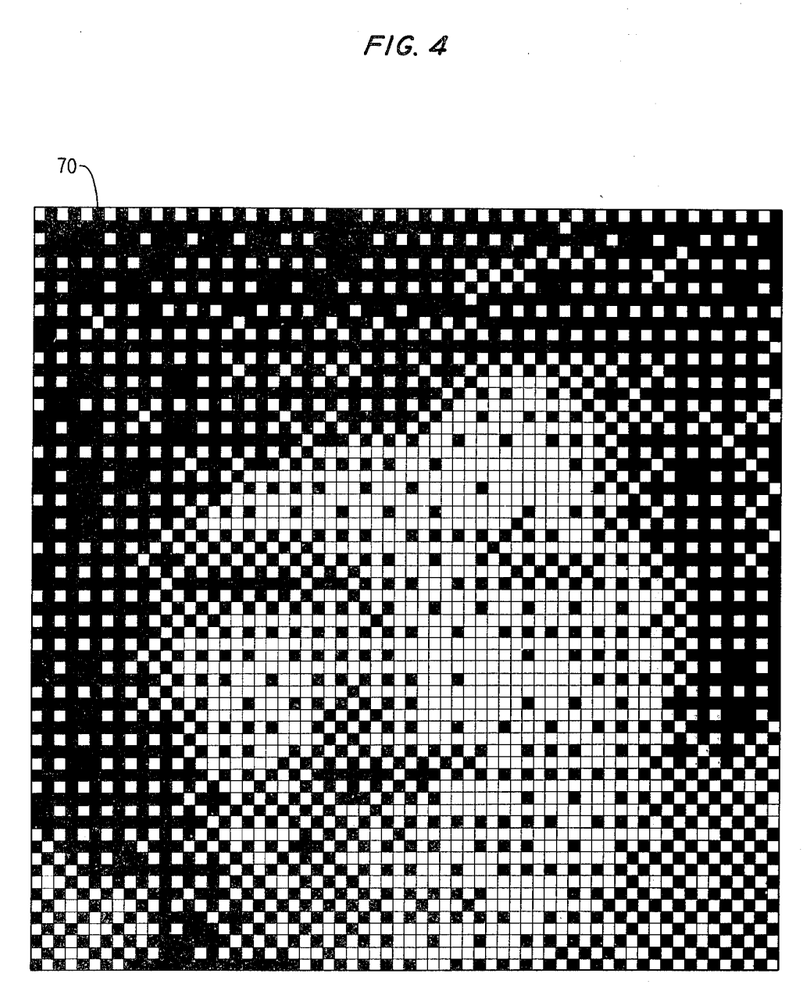
FIG. 4 is an enlarged view of the display panel utilized in the display system of FIG. 1, the panel having selected ones of its cells energized to present a dithered image.

FIG. 3 shows a map of picture element intensity values for a small portion of an illustrative scanned image to be presented on panel 70. These picture elements correspond to respective ones of the lower right-hand corner cells of panel 70 shown in FIG. 2. FIG. 4 depicts an enlarged view of panel 70 with selected ones of its cells energized to present a dithered image. The light areas in FIG. 4 correspond to display cells which are on. The dark areas correspond to display cells which are off. The pattern of on and off cells in the lower right-hand corner of FIG. 4 is derived by comparing the picture element intensity values in the map of FIG. 3 with the dither threshold values assigned to the corresponding cells of panel 70 shown in FIG. 2. When the viewer observes the FIG. 4 representation of panel 70 from a distance, it will be seen that, as a result of the above-described dither processing, various shades of gray appear in the reproduced image.

The circuitry in FIG. 1 which provides for the presentation of dithered images on panel 70 in the manner described above includes camera 10 and circuitry in signal processor 40 including clock 11, analog-to-digital converter 12, address register 15, 16-word read-only memory (ROM) 16, comparator 21 and address register 45.

An image to be displayed is scanned by camera 10 in a format which divides the image into a matrix of 4096 picture elements arranged in 64 rows and 64 columns. Scanning begins with the top row and proceeds from left to right in each row. Camera 10 generates an analog signal representing the intensity of the picture element currently being scanned. Each of successive, regularly spaced pulses from clock 11 causes the signal representing the intensity of a successive scanned picture element to be extended from camera 10 to analog-to-digital converter 12. The latter quantizes each intensity signal extended thereto into one of 256 levels. A multi-bit binary signal indicative of that level is extended to comparator 21 via binary leads 13 and cable 14.

The pulses from clock 11 are also extended to address register 15. The latter comprises an 8-stage binary counter which advances one count for each pulse from clock 11. The two lowest-order address leads 16A of ROM 16 are coupled to the outputs of the two least significant stages of register 15. The two highest-order address leads 16B of ROM 16 are coupled to the two most significant stages of register 15. The sixteen dither threshold values assigned to the cells in each submatrix of panel 70 as shown in FIG. 2 are stored in ROM 16 in the order 0, 128, 32, 160, 192, 64, 224, 96, 48, 176, 16, 144, 240, 112, 208, 80.

Thus it will be appreciated that the output of ROM 16 in response to each group of 256 successive pulses from clock 11 comprises the sequence 0, 128, 32, 160 repeated sixteen times, then the sequence 192, 64, 224, 96 repeated sixteen times, then the sequence 48, 176, 16, 144 repeated sixteen times and then the sequence 240, 112, 208, 80 repeated sixteen times. This sequence of threshold values is provided in binary form on output leads 17 of ROM 16 and is extended via cable 18, cable switch 22, and cable 24 to comparator 21. In this way, the quantized intensity value of each picture element is extended to comparator 21 concurrently with the dither threshold value assigned to the cell in display panel 70 which corresponds to that picture element.

The output of comparator 21 is a one-bit binary signal which is extended to data input terminal DT of panel 70 via lead 26. The value of the signal on lead 26 is 1 if the intensity value represented on cable 14 is greater than the dither threshold value represented on cable 24. This 1 indicates to panel 70 that the cell corresponding to the picture element currently being scanned should be on. Circuitry internal to panel 70 accesses that cell to extend a "write", or "energize", signal thereto. If, on the other hand, the intensity value represented on cable 14 is less than or equal to the dither threshold value represented on cable 24, a 0 is provided on lead 26 indicating that that cell should be off. In that case, the cell is accessed with an "erase", or "de-energize" signal.

A multi-bit binary signal indicating the location of the cell corresponding to the picture element currently being scanned is extended to address input AD of panel 70 from address register 45 via binary leads 61 and cable 46. Register 45 is illustratively a 12-stage binary counter which advances one count for each pulse from clock 11. The six most significant and the six least significant bits on leads 61 respectively indicate the row and column of panel 70 in which the cell in question is located.

Animated dithered images could be presented in a dithered display system such as that shown in FIG. 1 by simply scanning successive frames of the image and accessing each cell of the display panel with a "write" or an "erase" signal as just described. As indicated above, however, it may not be practicable to utilize this animation technique in display systems having slow-access-rate cells since each cell must be accessed for each frame. Panel 70 illustratively comprises such cells.

However, in accordance with the present invention, the dithered display system of FIG. 1 is adapted to present animated images via circuitry for implementing conditional replenishment. In accordance with this many the only display cells which are accessed to receive an "energize" or a "de-energize" signal for any given frame are cells which are to have states in that frame which differ from their respective states in the previous frame. The remaining cells are not accessed at all, but, rather, are maintained in their respective previous on or off states. In presenting may types of animated dithered images, such as faces, only a small fraction of the display cells have different states in successive frames. Thus, by implementing the above-described conditional replenishment technique in a plasma panel system or other display system having slow-access-rate cells, successive frames of animated dithered images can be presented at a frame rate sufficient to depict smooth, continuous motion.

The circuitry which adapts the display system of FIG. 1 to present animated images via the above-described conditional replenishment technique in accordance with the invention includes exclusive-OR circuit 41, delay unit 42 and frame memory 50. Frame memory 50 has facility to store 4096 bits, each corresponding to a respective display cell in panel 70. The value of each bit in memory 50 indicates the current state of the corresponding display cell— 1 for on and 0 for off. Memory 50 operates in response to a signal on output-enable lead 52 to provide on data output lead 51 a bit indicating the current state of whichever cell is identified by the address on cable 46. The signal on output-enable lead 52 is derived from clock 11 via delay unit 42. The latter assures that address register 45 has "settled down" before the data output of memory 50 is enabled.

Assume that a first dithered frame of an animated sequence has been presented on panel 70 in the manner described above and that camera 10 now begins to scan a second frame of the sequence. As before, the signal on lead 26 indicates the state in which the cell corresponding to the picture element currently being scanned is to reside. Again, the signal on cable 46 indicates to panel 70 the location of that cell. However, a given cell will not be accessed to receive a write or an erase signal unless a binary signal of value 1 is provided at "change-state" terminal CS of panel 70, indicating that the state of that cell is to change.

The signal at change-state terminal CS is generated by exclusive-OR circuit 41 and is extended to panel 70 via lead 43. Exclusive-OR circuit 41 is responsive to the signals on leads 26 and 51. Thus exclusive-OR circuit 41 provides a binary 1 on lead 43 if and only if the state of the cell corresponding to the picture element currently being scanned is different for the first and second frames. In that event the cell in question, as identified by the address on cable 46, is accessed within panel 70 and its state is changed to the state indicated on lead 26.

The signals on leads 26 and 43 are also extended to data input lead 47 and input-enable lead 48 of memory 50, respectively. Whenever the value of the signal on lead 48 is 1, the signal on lead 47 indicating the new cell state is written into memory 50 at the appropriate memory location.

The display system of FIG. 1 operates in the above-described manner with respect to each scanned picture element for each frame of the animated sequence. It is thus seen that the present invention advantageously provides for the display of such sequences without the necessity of accessing each cell of the display panel for each frame. The invention thus enables the presentation of animated dithered images in display systems which, because of limitations in cell access rate, were not able to display them heretofore.

Although conditional replenishment is an efficacious technique for providing animation in limited-access-rate dithered displays, it may, in a given application, manifest a displeasing effect which is attendant to animated dithered display systems generally. This effect is the random twinkling or scintillation of cells throughout the display. Scintillation in animated dithered displays arises, for example, when a relatively constant picture element intensity value is very close to the dither threshold value assigned to the corresponding display cell. Any noise in the display system which becomes superimposed on the intensity signal may then cause random crossing and recrossing of the dither threshold in successive frames and thus, cause a random scintillation of the cell.

Figure 5:
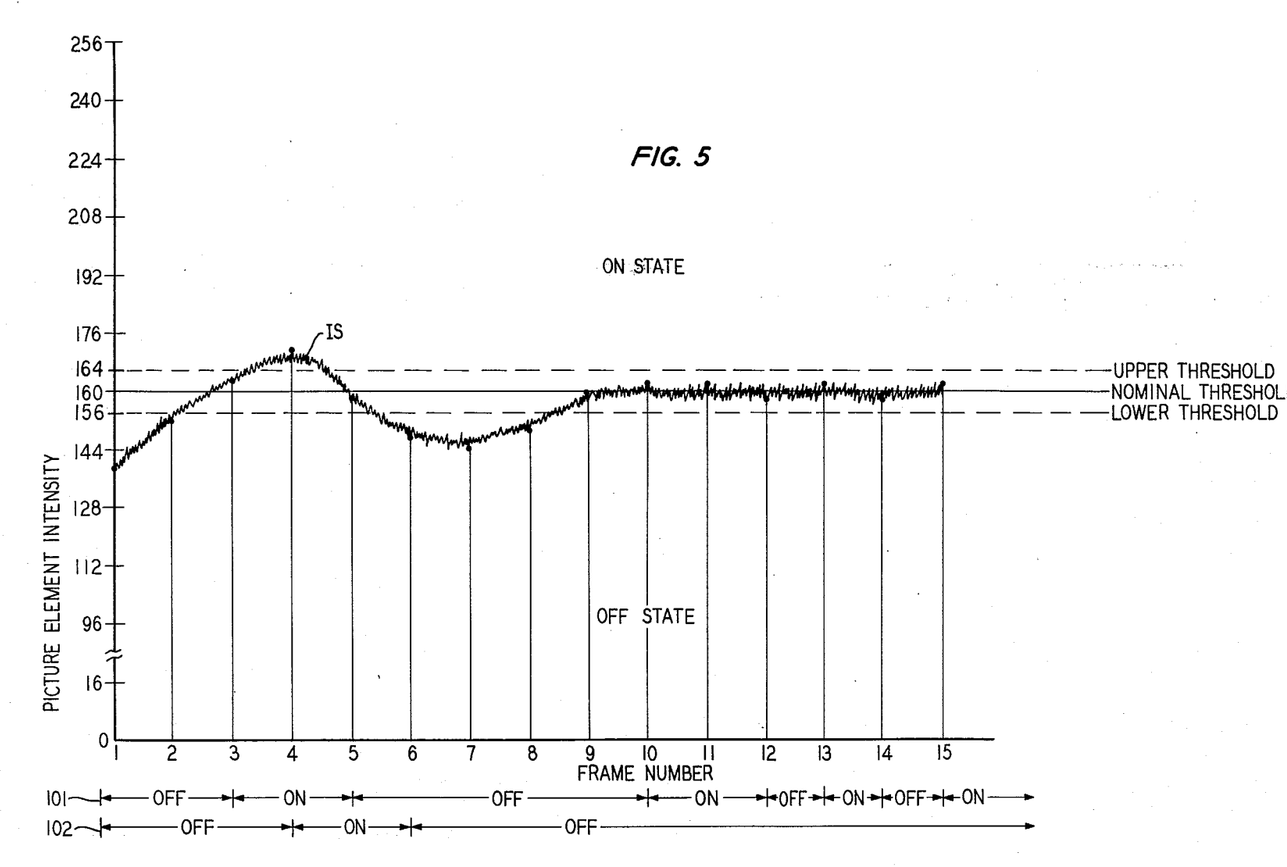
FIG. 5 is a time chart of the intensity value of a selected picture element of an an animated image to be displayed by the system of FIG. 1.

The nature of this scintillation effect may be more clearly understood by reference to FIG. 5 which shows a signal IS representing the intensity of a single selected picture element during successive frames of an animated sequence. As indicated in FIG. 5, signal IS includes a low-amplitude noise component superimposed thereon. As also indicated in FIG. 5, the conventional, or "normal", dither threshold value assigned to the display cell corresponding to this selected picture element is illustratively 160. Signal IS is scanned, or sampled, once in each frame at a predetermined point in the frame. Each scanning point is shown in FIG. 5 in alignment with the corresponding frame number marker on the horizontal axis. The precise value of signal IS at each scanning point is indicated by a dot.

The intensity of signal IS is less than the dither threshold 160 at the scanning points of frames 1, 2 and 5–9. Thus as indicated in line entry 101 of FIG. 5, the cell is off for each of these frames. The intensity of signal IS is greater than 160 in frames 3 and 4 and thus the cell is on for these frames. The average value of signal IS is just slightly below the dither threshold value throughout frames 10–15. However, the noise superimposed thereon causes the threshold to be crossed and recrossed at several points in frames 10–15 and the cell scintillates at random intervals.

Several alternative approaches may be taken to reduce this scintillation. One is to withhold changing the state of a cell unless the intensity value of the corresponding picture element remains on the same side of the dither threshold value for a predetermined number of frames, e.g., two frames. Another approach is to withhold changing the state of a cell unless such a change would appreciably alter the average intensity of the display panel in the immediate area of the cell in question.

However, a scintillation-reduction technique which appears to be simpler and at least as effective as either of the above is the "hysteretic dither thresholding" technique disclosed in the copending patent application of C. N. Judice and C. S. Roberts, Ser. No. 542,862 filed on the same day as this application and assigned to the same assignee. In accordance with that technique, a hysteresis band is established about each dither threshold value. The band is delimited by upper and lower dither threshold values located on opposite sides of the conventional, or nominal, value. An off cell is turned on only if the intensity of the corresponding picture element becomes greater than the upper threshold value. An on cell is turned off only if the intensity of the corresponding picture element becomes less than the lower threshold value.

Thus in FIG. 5, upper and lower threshold values at 164 and 156 are respectively established on opposite sides of the nominal dither threshold, 160. As indicated in line entry 102, the display cell in question is off in frames 1 and 2. The cell remains off in frame 3 even though signal IS is greater than the nominal threshold at the scanning point of that frame because signal IS is less than the upper threshold at that point. The cell is turned on in frame 4, however. Once the cell is on, it is not turned off until signal IS becomes less than the lower threshold. Thus the cell is on in frame 5 even though signal IS is less than the nominal threshold at the scanning point of that frame. Signal IS is less than the lower threshold in frame 6, however, and therefore the cell is off for that frame. The cell remains off in frames 7–15 because at no time is the upper threshold exceeded during these frames. The above-described random scintillation in frames 10–15 is thus seen to be eliminated.

Straightforward implementation of hysteretic dither thresholding as just described requires at least two memory bits per picture element (i.e., per display cell) in the signal processor—one bit to store the current state of the cell to determine whether the state of that cell differs in the current and subsequent frames and another bit to indicate whether, at any given time, the intensity of a given picture element is to be compared to the upper or lower dither threshold value assigned to the corresponding display cell.

However, the copending patent application of W. H. Ninke, Ser. No. 542,861 filed on the same day as this application and assigned to the same assignee, discloses circuitry which, advantageously, implements hysteretic dither thresholding in an animated dithered display with only one frame memory bit per picture element. Such circuitry is incorporated in the illustrative dithered display system of FIG. 1 and includes cable switch 22, adder/subtractor 31, hysteresis register 32 and inverter 34. This circuitry is made an operative part of the system by moving switch 22 to a position such that it is the output of adder/subtractor 31 on binary leads 35 and cable 38 which is extended to comparator 21 via cable 24, rather than the output of ROM 16.

Hysteresis register 32, which may comprise a binary counter, for example, provides a multi-bit binary signal on leads 33 and cable 38. This signal represents a predetermined number to be added to or subtracted from the nominal dither threshold value to derive the upper and lower dither threshold values, respectively. In the illustrative embodiment, this predetermined number is binary 100, i.e., a decimal 4.

Cable 38 is extended to one data terminal of adder/subtractor 31. A tap off cable 18 is extended to the other data terminal. Adder/subtractor 31 operates to add the numbers on cables 18 and 38 when 1 and 0 are provided at its + and − control terminals, respectively. It subtracts these numbers if the opposite relationship obtains.

The above-cited Ninke application teaches that determination of whether a given picture element is to be compared to the upper or lower dither threshold value assigned to the corresponding display cell can be made based on the current state of that cell. It will be remembered that the current state of each cell in the display system of FIG. 1 is stored in frame memory 50 and is provided on lead 51 as the picture element to which a particular cell corresponds is being scanned. Thus in FIG. 1, the signals at the + and − control terminals of adder/subtractor 31 are derived from the bit on lead 51. More particularly, a tap taken off that lead is coupled to the − control terminal directly and to the + control terminal through inverter 34.

When the cell corresponding to a picture element currently being scanned is on, a 1 is provided on lead 51 and thus at the − control terminal of adder/subtractor 31. At the same time, a 0 is provided at the + control terminal thereof. The number on cable 38 is subtracted from the nominal dither threshold value on cable 18. Comparator 21 thus compares the quantized intensity of the picture element being scanned to the lower threshold value assigned to the corresponding display cell.

Conversely, when the cell corresponding to a picture element currently being scanned is off, 1 and 0 are provided at the + and − terminals of adder/subtractor 31, respectively. The numbers on cables 18 and 38 are added together. Comparator 21 thus compares the quantized intensity value of the picture element being scanned to the upper threshold value assigned to the corresponding display cell.

Although the conditional replenishment technique implemented in the display system of FIG. 1 as described hereinabove requires a relatively small number of cells to be accessed for any given frame, it may turn out that those cells which are accessed in a given frame may be identified to panel 70 during a relatively small fraction of the frame period rather than being spread thereacross randomly. This may happen, for example, where movement in the displayed image is confined to a relatively small area such as the mouth of a person speaking. In this situation, again, it may not be possible to address even those few cells at a fast enough rate. Accordingly, the circuitry in panel 70 may advantageously include a buffer of conventional first-in, first-out design (not shown) for temporarily storing the data and address information extended to the panel until such time as each cell to be changed can be accessed.

As an alternative or in addition to such a buffer, the display system of FIG. 1 may include circuitry responsive to an abnormally high number of cell state changes per frame to modify the width of the hysteresis band about each nominal dither threshold value. Although this technique causes some degradation of image quality, it advantageously reduces the number of cells which are required to change state for any given frame. An overflow lead 71 extending from panel 70 to hysteresis register 32 is provided for this purpose. When the cell change rate reaches some predetermined level such as indicated by a certain amount of data backlog in the buffer within panel 70, a first signal is provided on overflow lead 71. This signal increases the count in hysteresis register 32 and thus widens the hysteresis band about each nominal dither threshold value. When the overflow condition in the buffer within panel 70 abates, as indicated by a second signal on lead 71, the count in register 32 is returned to its original predetermined value.

Although in the illustrative display system of FIG. 1, the change-state signal on lead 43 is extended to panel 70, it will be appreciated that this signal may, alternatively, be utilized as a signal internal to processor 40 to gate the data and address information therefrom to the display panel. In such an arrangement, the fact that a data bit and corresponding address are extended to the display panel indicates that the state of the identified cell is to be changed.

It will thus be appreciated that the conditional replenishment technique of the present invention substantially reduces the number of information bits per unit time which are required to be extended to a display panel in order to have animated dithered images presented thereon. The bandwidth required to transmit such images to the display panel is thus also advantageously decreased. Additionally, the above-described hysteretic dither thresholding technique further reduces this bandwidth requirement since that technique additionally reduces the number of information bits per unit time which are required to be extended to the display panel.

Furthermore, although the above discussion has been principally directed to display of monochromatic images and, in particular, to animation of such images, it will be appreciated that dither processing can be utilized to display both single-frame and animated polychromatic, or "color", images as well. In such an arrangement, each cell of the display panel comprises a cluster of display devices each adapted to present a different color (e.g., a cluster of three devices to present red, green and blue, respectively) when energized. As in a monochromatic dithered display system, each display device of the polychromatic display cell cluster can only be fully energized or fully de-energized.

When the image to be reproduced is scanned, three intensity signals are generated for each picture element. Each intensity signal indicates the degree to which a selected one of the three colors is present in the particular picture element. The value of each intensity signal associated with a given display cell is compared to the dither threshold value assigned thereto. For each intensity signal which exceeds the dither threshold value, the corresponding display device within the cell cluster is energized. Conversely, for each intensity signal which does not exceed the dither threshold value, the corresponding display device within the cell cluster is de-energized. The result is a pleasing color image, which, advantageously, may be animated in accordance with the principles of the present invention. Advantageously, the subjective impression of variations in luminance, or intensity, is provided in the image, even though each display device within each cell cluster can only be fully energized or fully de-energized.

It will be appreciated from the foregoing that although an illustrative embodiment of an animated dithered display system in accordance with the principles of the invention is shown and described herein, many and varied arrangements in accordance with those principles may be devised by those skilled in the art without departing from the spirit and scope of the invention.

What is claimed is:

1. In a display system including a plurality of selectively energized and de-energized bi-level display cells to which are assigned respective dither threshold values, a method for representing a matrix of picture elements each having a predetermined intensity and each corresponding to a respective one of said display cells, said method comprising the steps of accessing a de-energized one of said cells only if the intensity of the corresponding picture element bears a first predetermined relationship to the dither threshold value assigned to that cell, and accessing an energized one of said cells only if the intensity of the corresponding picture element bears a second predetermined relationship to the dither threshold value assigned to that cell.

2. In a display system including a matrix of selectively energized and de-energized display cells arranged in a plurality of n cell-by-n cell submatrices, n being an integer power of 2, and each cell of each submatrix having assigned thereto a different threshold value taken from a predetermined dither matrix $D_n$, said dither matrix comprising the matrices $k[4D_{n/2}]$, $k[4D_{n/2} + U_{n/2}]$, $k[4D_{n/2} + 2U_{n/2}]$ and $k[4D_{n/2} + 3U_{n/2}]$ in two-by-two arrangement, $D_2$ being a two-by-two matrix comprising the numbers 0, 1, 2 and 3, $U_2$ being a two-by-two matrix each element of which is 1, and $k$ being a predetermined scalar constant, a method for representing a matrix of picture elements each having a predetermined intensity and each corresponding to a respective one of said display cells, said method comprising the steps of identifying each picture element having an intensity which exceeds the dither threshold value assigned to its corresponding display cell and applying energization signals exclusively to each de-energized such cell, and identifying each picture element having an intensity which is less than the dither threshold value assigned to its corresponding display cell and applying de-energization signals exclusively to each energized such cell.

3. In a display system including a matrix of selectively energized and de-energized display cells, a method for representing a matrix of picture elements each corresponding to a respective one of said display cells and each having a respective intensity, said method comprising the steps of defining a plurality of submatrices of said cells, assigning each threshold value of a predetermined dither matrix $D_n$ to a spatially corresponding cell of each of said cell submatrices, applying an energization signal to an individual one of said cells only if the intensity of the corresponding picture element is greater than the dither threshold value assigned to that cell and that cell is de-energized, and applying a de-energization signal to an individual one of said cells only if the intensity of the corresponding picture element is less than the dither threshold value assigned to that cell and that cell is energized.

4. The method of claim 3 wherein in said assigning step said dither matrix $D_n$ has $n^2$ elements, $n$ being an integer power of 2, and said dither matrix $D_n$ comprises the matrices $k[4D_{n/2}]$, $k[4D_{n/2} + U_{n/2}]$, $k[4D_{n/2} + 2U_{n/2}]$ and $k[4D_{n/2} + 3U_{n/2}]$ in two-by-two arrangement, $D_2$ being a two-by-two matrix comprising the numbers 0, 1, 2 and 3, $U_2$ being a two-by-two matrix each element of which is 1, and $k$ being a predetermined scalar constant.

5. The method of claim 4 wherein said matrices $k[4D_{n/2}]$ and $k[4D_{n/2} + U_{n/2}]$ are located on a single one diagonal of said dither matrix $D_n$ and said numbers 0 and 1 are located on a single one diagonal of said matrix $D_2$.

6. In a display system including a matrix of normally de-energized bi-level display cells to each of which correspond a first frame and a second frame picture element intensity and to each of which is assigned a respective threshold value from a predetermined dither matrix $D_n$, a display method comprising the steps of identifying each cell having a corresponding first frame picture element intensity with bears a first predetermined relationship to the threshold value assigned thereto and extending an energization signal to each such cell, identifying each de-energized cell having a corresponding second frame picture element intensity which bears said first predetermined relationship to the threshold value assigned thereto and extending an energization signal exclusively to each such cell, and identifying each energized cell having a corresponding second frame picture element intensity which bears a second predetermined relationship to the threshold value assigned thereto and extending a de-energization signal exclusively to each such cell.

7. The method of claim 6 wherein said first and second predetermined relationships are the relationships "greater than" and "less than," respectively, and wherein said dither matrix $D_n$ comprises the matrices $k[4D_{n/2}]$, $k[4D_{n/2} + U_{n/2}]$, $k[4D_{n/2} + 2U_{n/2}]$ and $k[4D_{n/2} + 3U_{n/2}]$ in two-by-two arrangement, $D_2$ being a two-by-two matrix comprising the numbers 0, 1, 2, and 3, $U_2$ being a two-by-two matrix each element of which is 1, and $k$ being a predetermined scalar constant.

8. A method for displaying first and second dithered image frames on a display medium comprising a plurality of bi-level display cells, said first and second dithered image frames being respectively represented by first and second pluralities of bi-valued display bits, each of said display cells having a corresponding display bit in each of said pluralities, said method comprising the steps of, displaying the value of each first plurality display bit on its corresponding display cell and, thereafter, displaying the value of each second plurality display bit on its corresponding display cell, said second displaying step characterized by the steps of comparing the value of the display bits which correspond to each of said cells and, in response to said comparing step, altering the state of each cell having corresponding first plurality and second plurality display bits which have different values.

9. A display system comprising, a display panel having a plurality of selectively energizable display cells, means for receiving a time-varying signal representing the intensity of a selected picture element of an animated image, means for providing a signal representing a predetermined dither threshold value assigned to a selected one of said display cells, and means operative when said intensity signal bears a first predetermined relationship to said threshold signal for applying a de-energization signal to said selected cell only if it is in an energized state and further operative when said intensity signal bears a second predetermined relationship to said threshold signal for applying an energization signal to said selected cell only if it is in a de-energized state.

10. The display system of claim 9 wherein said selected cell comprises one cell of an $n$ cell-by-n cell submatrix of said cells and wherein said dither threshold value is taken from a dither matrix $D_n$ having dither threshold values each assigned to a respective cell of said cell submatrix.

11. The display system of claim 10 wherein n is an integer power of 2 and wherein said dither matrix $D_n$ comprises the matrices $k[4D_{n/2}]$, $k[4D_{n/2} + U_{n/2}]$, $k[4D_{n/2} + 2U_{n/2}]$ and $k[4D_{n/2} + 3U_{n/2}]$ in two-by-two arrangement, $D_2$ being a two-by-two matrix comprising the numbers 0, 1, 2 and 3, $U_2$ being a two-by-two matrix each element of which is 1, and $k$ being a predetermined scalar constant.

12. The display system of claim 10 wherein said providing means includes a memory for storing said dither threshold values of said dither matrix $D_n$ and means responsive to a signal related to the location of said selected cell in said cell submatrix for extending said predetermined dither threshold value to said applying means.

13. A display system including a plurality of selectively energizable and de-energizable bi-level display cells to which are assigned respective dither threshold values, and circuitry for representing a matrix of picture elements each having a predetermined intensity and each corresponding to a respective one of said display cells, said circuitry comprising means for accessing a de-energized one of said cells only if the intensity of the corresponding picture element bears a first predetermined relationship to the dither threshold value assigned to that cell and for accessing an energized one of said cells only if the intensity of the corresponding picture element bears a second predetermined relationship to the dither threshold value assigned to that cell.

14. A display system including a matrix of selectively energizable and de-energizable display cells arranged in a plurality of $n$ cell-by-n cell submatrices, $n$ being an integer power of 2, and each cell of each submatrix having assigned thereto a different threshold value taken from a predetermined dither matrix $D_n$, said dither matrix comprising the matrices $k[4D_{n/2}]$, $k[4D_{n/2} + U_{n/2}]$, $k[4D_{n/2} + 2U_{n/2}]$ and $k[4D_{n/2} + 3U_{n/2}]$ in two-by-two arrangement $D_2$ being a two-by-two matrix comprising the numbers 0, 1, 2 and 3, $U_2$ being a two-by-two matrix each element of which is 1, and $k$ being a predetermined scalar constant, and circuitry for representing a matrix of picture elements each having a predetermined intensity and each corresponding to a respective one of said display cells, said circuitry comprising means for identifying each picture element having an intensity exceeding the dither threshold value assigned to its corresponding display cell and for applying energization signals exclusively to each de-energized such cell and for identifying each picture element having an intensity less than the dither threshold value assigned to its corresponding display cell and for applying deenergization signals exclusively to each energized such cell.

15. Circuitry for displaying first and second dithered image frames on a display medium which includes a plurality of two-state display cells, said circuitry comprising means for receiving first and second pluralities of bi-valued display bits, said pluralities respectively representing said first and second dithered image frames, each one display bit from each of said pluralities corresponding to a different one of said display cells, and means for successively displaying the values of each of said first plurality and second plurality display bits on the display cell corresponding thereto, said displaying means characterized by means for comparing the value of the first and second plurality display bits corresponding to each one of said cells and means operative for altering the state of an individual one of said cells when the value of a first plurality display bit being displayed on said one cell is different from the second plurality display bit corresponding to said one cell.

* * * * *

UNITED STATES PATENT AND TRADEMARK OFFICE
CERTIFICATE OF CORRECTION

PATENT NO. : 3,937,878
DATED : February 10, 1976
INVENTOR(S) : Charles N. Judice It is certified that error appears in the above-identified patent and that said Letters Patent are hereby corrected as shown below:

Column 2, line 49, change "to" to --of--. Column 5, line 32 change "many" to --technique--; line 38, change "may" to --many--. Column 6, line 57, change "normal" to --nominal--. Column 11, line 34, change "with" to --which--.

Signed and Sealed this twenty-second Day of June 1976

[SEAL]

Attest:

RUTH C. MASON
*Attesting Officer*

C. MARSHALL DANN
*Commissioner of Patents and Trademarks*